United States Patent
Hiromura et al.

(10) Patent No.: US 11,220,248 B2
(45) Date of Patent: Jan. 11, 2022

(54) BRAKING CONTROL DEVICE FOR VEHICLE

(71) Applicant: ADVICS CO., LTD., Kariya (JP)

(72) Inventors: Tatsuya Hiromura, Anjo (JP); Yukio Mori, Kariya (JP)

(73) Assignee: ADVICS CO., LTD., Kariya (JP)

( * ) Notice: Subject to any disclaimer, the term of this patent is extended or adjusted under 35 U.S.C. 154(b) by 142 days.

(21) Appl. No.: 16/611,252

(22) PCT Filed: May 23, 2018

(86) PCT No.: PCT/JP2018/019733
§ 371 (c)(1),
(2) Date: Nov. 6, 2019

(87) PCT Pub. No.: WO2018/221328
PCT Pub. Date: Dec. 6, 2018

(65) Prior Publication Data
US 2020/0156610 A1 May 21, 2020

(30) Foreign Application Priority Data

May 29, 2017 (JP) .............................. JP2017-105697

(51) Int. Cl.
*B60T 13/66* (2006.01)
*B60T 7/12* (2006.01)
(Continued)

(52) U.S. Cl.
CPC .............. *B60T 13/662* (2013.01); *B60T 7/12* (2013.01); *B60T 8/172* (2013.01); *B60T 8/3275* (2013.01); *B60T 13/68* (2013.01)

(58) Field of Classification Search
CPC ...... B60T 13/662; B60T 8/172; B60T 8/3275; B60T 7/12; B60T 13/68; B60W 30/18118
See application file for complete search history.

(56) References Cited

U.S. PATENT DOCUMENTS 5,692,990 A * 12/1997 Tsukamoto ............. F16H 61/20
477/93
2020/0010063 A1* 1/2020 Miyachi .................... B60T 8/17

FOREIGN PATENT DOCUMENTS

| JP | 2004-231068 A | | 8/2004 |
| JP | 2015-168341 A | | 9/2015 |
| JP | 2017-56870 A | * | 3/2017 |

OTHER PUBLICATIONS

Translation of Japanese Patent No. 2017-56870 obtained from website: https://worldwide.espacenet.com on May 25, 2021.*

(Continued)

*Primary Examiner* — Pamela Rodriguez
(74) *Attorney, Agent, or Firm* — Oblon, McClelland, Maier & Neustadt, L.L.P.

(57) ABSTRACT

A control device including a valve-opening control unit that reduces the current value below the holding current value and increases the opening degree of the differential pressure adjustment valve when an increase in a manipulated variable of a braking operation member has been detected while holding control is being performed; and a valve-closing control unit that, when a decrease in the manipulated variable of the braking operation member has been detected while the opening degree of the differential pressure adjustment valve has been increased by the valve-opening control unit, performs a pushing process of increasing the current value above the holding current value and closing the differential pressure adjustment valve, and a holding process of setting the current value to the holding current value after the pushing process has ended.

2 Claims, 6 Drawing Sheets

(51) Int. Cl.
*B60T 8/172* (2006.01)
*B60T 8/32* (2006.01)
*B60T 13/68* (2006.01)

(56) References Cited

OTHER PUBLICATIONS

International Search Report dated Jul. 31, 2018 for PCT/JP2018/019733 filed on May 23, 2018.

* cited by examiner

WHEEL CYLINDER SIDE

WHEEL CYLINDER SIDE

BRAKING CONTROL DEVICE FOR VEHICLE

TECHNICAL FIELD

The present invention relates to a braking control device for a vehicle that adjusts a fluid pressure in a wheel cylinder provided for a wheel.

BACKGROUND ART

Patent Literature 1 discloses one example of a braking control device that performs a holding control of holding the fluid pressure in the wheel cylinder by operating a master cut valve and a regulator cut valve, which are control valves arranged between the wheel cylinder and the master cylinder, to maintain the stop state. That is, in this device, when an increase in the braking manipulated variable is detected under the situation where the holding control is being performed, the control valve is opened. Thus, even if the increase in the braking manipulated variable is started by the vehicle driver under the situation where the holding control is being performed, the brake fluid in the master cylinder flows out toward the wheel cylinder side through the control valve, and thus the braking manipulated variable can be increased in accordance with an increase in the operation force of the brake pedal by the driver. That is, deterioration of the feeling felt by the driver with respect to the operation of the brake pedal can be suppressed.

Furthermore, in the device described in Patent Literature 1, when decrease in the braking manipulated variable is started under a situation where the control valve is opened in accordance with the increase in the braking manipulated variable during the holding control, the control valve is closed at a time point the fluid pressure in the master cylinder reaches a predetermined pressure. Thus, even if the operation of the brake pedal is canceled, the outflow of the brake fluid from the wheel cylinder is suppressed by the control valve. As a result, a decrease in the fluid pressure in the wheel cylinder is suppressed, and furthermore, the stop state can be maintained.

CITATIONS LIST

Patent Literature

Patent Literature 1: Japanese Laid-Open Patent Publication No. 2015-168341

SUMMARY OF INVENTION

Technical Problems

An electromagnetic differential pressure adjustment valve that controls a "differential pressure" which is a pressure difference between the pressure on the master cylinder side of the control valve and the pressure on the wheel cylinder side of the control valve may be used as a control valve disposed between the wheel cylinder and the master cylinder. The differential pressure adjustment valve can adjust the differential pressure by causing a current corresponding to a differential pressure command value with respect to the differential pressure adjustment valve to flow through the solenoid.

If the decrease rate in the braking manipulated variable is high, the decrease rate of the fluid pressure in the master cylinder increases, and thus the increase rate in the differential pressure increases. As a result, when the control valve is opened immediately after the start of decrease of the braking manipulated variable, the amount of brake fluid flowing from the wheel cylinder side to the master cylinder side through the control valve increases. At this time, in a braking device adopting a differential pressure adjustment valve as the control valve, if a differential pressure command value with respect to the control valve is equal to a predetermined value because a decrease in the braking manipulated variable is detected, the control valve may not be closed due to the force of the flow of the brake fluid flowing from the wheel cylinder side toward the master cylinder side through the control valve. If the control valve cannot be closed in this way, the brake fluid in the wheel cylinder excessively flows out toward the master cylinder side, the differential pressure falls below the predetermined value, and the fluid pressure in the wheel cylinder generated by the operation of the control valve cannot be held at an intended pressure value or a value close to the intended pressure value. The "intended pressure value" here is a pressure value corresponding to the predetermined value. The fluid pressure in a wheel cylinder may fall below the intended pressure value, and the braking force with respect to a wheel may fall below the intended braking force. Therefore, there is room for improvement in improving the controllability of the fluid pressure in the wheel cylinder after the start of decrease in the braking manipulated variable.

Solutions to Problems

A braking control device for a vehicle for solving the problems described above assumes a device applied to a braking device for a vehicle including a control valve arranged between a master cylinder in which fluid pressure generated inside increases as a manipulated variable of a braking operation member increases and a wheel cylinder provided with respect to a wheel, the device performing a holding control of holding a differential pressure, which is a pressure difference between the master cylinder side and the wheel cylinder side with respect to the control valve, at a prescribed differential pressure by setting a current value input to the control valve to a predetermined holding current value. The braking control device includes a valve-opening control unit that makes a current value input to the control valve smaller than the holding current value and increases an opening degree of the control valve when increase in a manipulated variable of the braking operation member is detected during the execution of the holding control; and a valve-closing control unit that, when decrease in the manipulated variable of the braking operation member is detected under a situation where the opening degree of the control valve is increased by the valve-opening control unit, sets the current value input to the control valve to a value larger than the holding current value, and performs a pushing process of shifting the control valve from a non-closed state to a closed state and a holding process of setting the current value input to the control valve at the holding current value after the pushing process has ended.

According to the above configuration, when the operation force input to the braking operation member from the driver increases during the execution of the holding control, the opening degree of the control valve is increased with the detection of an increase in the manipulated variable of the braking operation member as a trigger. Thus, the brake fluid in the master cylinder is likely to flow out to the wheel cylinder side through the control valve, so that deterioration in the feeling felt by the driver with respect to the operation of the braking operation member during the execution of the holding control can be suppressed.

Thereafter, when the operation force input to the braking operation member is reduced, the brake fluid in the wheel cylinder flows out to the master cylinder side through the control valve because the control valve is not closed. In such a case, the operation of the control valve is controlled in order to hold the fluid pressure in the wheel cylinder at an intended pressure value or a value close to the intended pressure value by controlling the differential pressure. That is, when a decrease in the manipulated variable of the braking operation member is detected, the current value input to the control valve is set to a value larger than the holding current value by performing the pushing process. Thus, compared with a case where the current value input to the control valve is set to the holding current value, the force of pushing the valve body against the valve seat in the control valve can be increased. Therefore, even if the amount of brake fluid flowing from the wheel cylinder side toward the master cylinder side through the control valve is large, the control valve can be closed. As a result, even if the amount of brake fluid flowing from the wheel cylinder side toward the master cylinder side through the control valve is large, the outflow amount of the brake fluid in the wheel cylinder at the beginning of the decrease in the manipulated variable of the braking operation member can be reduced.

When the execution of the pushing process is continued, a state in which the decrease in the fluid pressure in the wheel cylinder is suppressed is continued even if the differential pressure reaches the prescribed differential pressure, and hence the differential pressure greatly exceeds the prescribed differential pressure, and the fluid pressure in the wheel cylinder greatly exceeds the intended pressure value. In this regard, in the above configuration, since the holding process is performed after the completion of the pushing process, the current value input to the control valve is reduced to the holding current value. In this case, compared with a case where the execution of the pushing process is continued, the brake fluid in the wheel cylinder easily flows out to the master cylinder side through the control valve as the force for pushing the valve body against the valve seat in the control valve becomes smaller. As a result, when the differential pressure reaches the prescribed differential pressure or a value close to the prescribed differential pressure, the brake fluid in the wheel cylinder is more likely to flow out to the master cylinder side through the control valve than before. That is, by performing the holding process after the pushing process has ended, an event in which the differential pressure greatly exceeds the prescribed differential pressure is less likely to occur than when the execution of the pushing process is continued and the holding process is not performed. That is, an event in which the fluid pressure in the wheel cylinder greatly exceeds the intended pressure value is less likely to occur.

Therefore, according to the above configuration, the controllability of the fluid pressure in the wheel cylinder after the decrease in the manipulated variable of the braking operation member is started can be improved.

DESCRIPTION OF EMBODIMENTS

Hereinafter, one embodiment of a braking control device for a vehicle will be described with reference to FIGS. 1 to 7.

Figure 1:
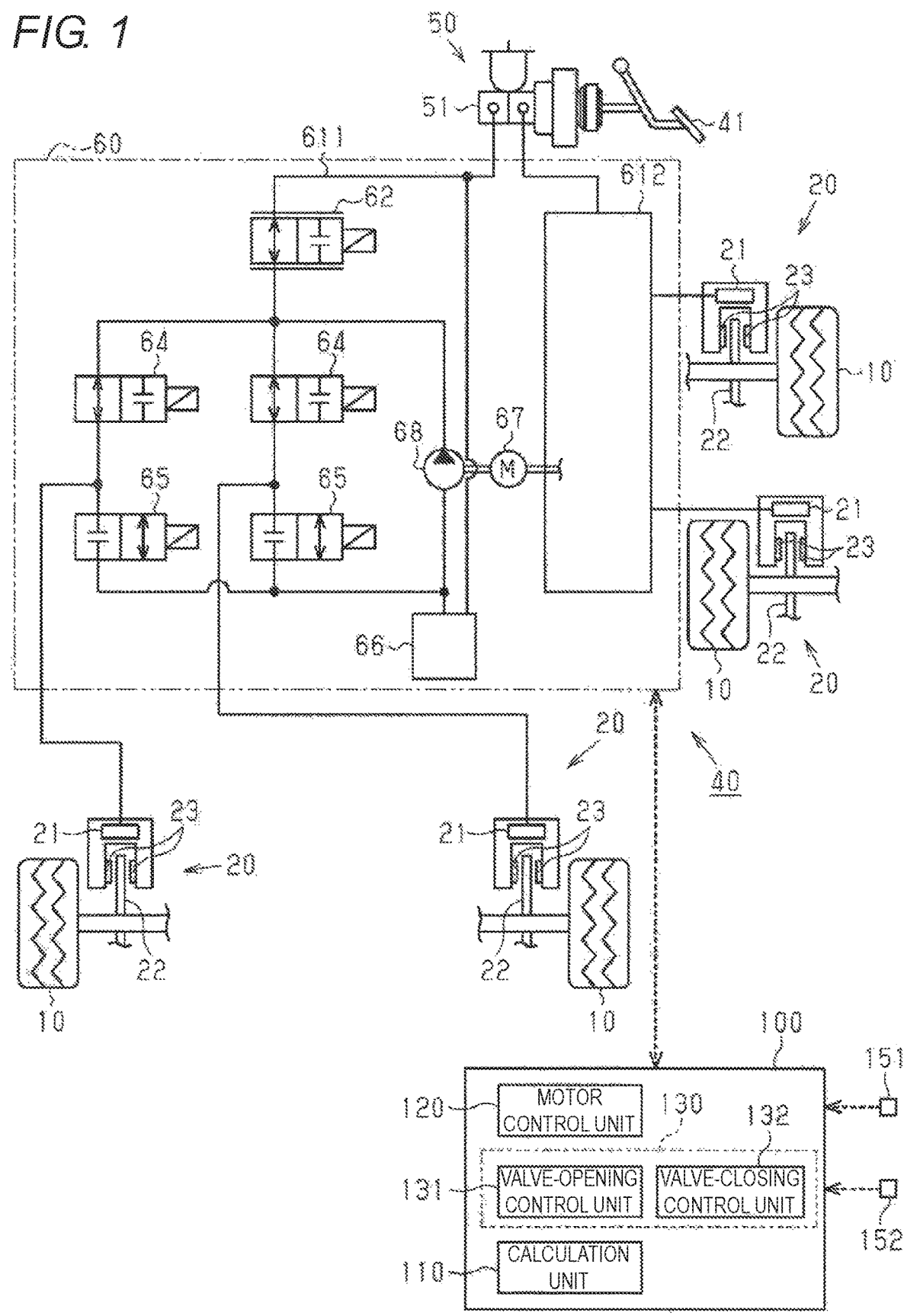
FIG. 1 is a view showing a functional configuration of a control device serving as an embodiment of a braking control device for a vehicle and a schematic configuration of a braking device including the control device.

The vehicle shown in FIG. 1 includes a plurality of (i.e., same number as the wheels) braking mechanisms 20 individually provided with respect to a plurality of wheels 10, and a braking device 40.

As shown in FIG. 1, each braking mechanism 20 includes a wheel cylinder 21 to which brake fluid is supplied, a rotating body 22 that rotates integrally with the wheel 10, and a friction material 23 that relatively moves in a direction moving toward and moving away from the rotating body 22. In each of the braking mechanisms 20, as the WC pressure Pwc, which is the fluid pressure in the wheel cylinder 21, becomes higher, the force that presses the friction material 23 against the rotating body 22, that is, the braking force with respect to the wheel 10 can be increased.

The braking device 40 includes a fluid pressure generator 50 to which a braking operation member 41 such as a brake pedal operated by the driver is connected, and a braking actuator 60 capable of individually adjusting the WC pressure Pwc in each wheel cylinder 21.

The fluid pressure generator 50 includes a master cylinder 51. The MC pressure Pmc, which is the fluid pressure generated in the master cylinder 51, increases as the manipulated variable BPInput of the braking operation member 41 by the driver increases.

The braking actuator 60 includes two systems of hydraulic circuits 611 and 612. Two wheel cylinders 21 among the wheel cylinders 21 are connected to the first hydraulic circuit 611. The remaining two wheel cylinders 21 are connected to the second hydraulic circuit 612.

The first hydraulic circuit 611 is provided with a differential pressure adjustment valve 62 serving as a control valve disposed between the master cylinder 51 and the wheel cylinder 21, a holding valve 64 that is closed when regulating the increase in the WC pressure Pwc, and a pressure decreasing valve 65 that is opened when decreasing the WC pressure Pwc. The differential pressure adjustment valve 62 is a normally opened linear electromagnetic valve, and operates to adjust a differential pressure Psub which is a pressure difference between the master cylinder 51 side of the differential pressure adjustment valve 62 and the wheel cylinder 21 side of the differential pressure adjustment valve 62. A reservoir 66 for temporarily storing the brake fluid that flowed out from the wheel cylinder 21 through the pressure decreasing valve 65, and a pump 68 that is operated based on the drive of an electromotor 67 are connected to the first hydraulic circuit 611. The pump 68 is operated when adjusting the WC pressure Pwc.

Since the structure of the second hydraulic circuit 612 is substantially the same as the structure of the first hydraulic circuit 611, the description of the structure of the second hydraulic circuit 612 will be omitted in the present description.

Next, the configuration of the differential pressure adjustment valve 62 will be described with reference to FIG. 2.

Figure 2:
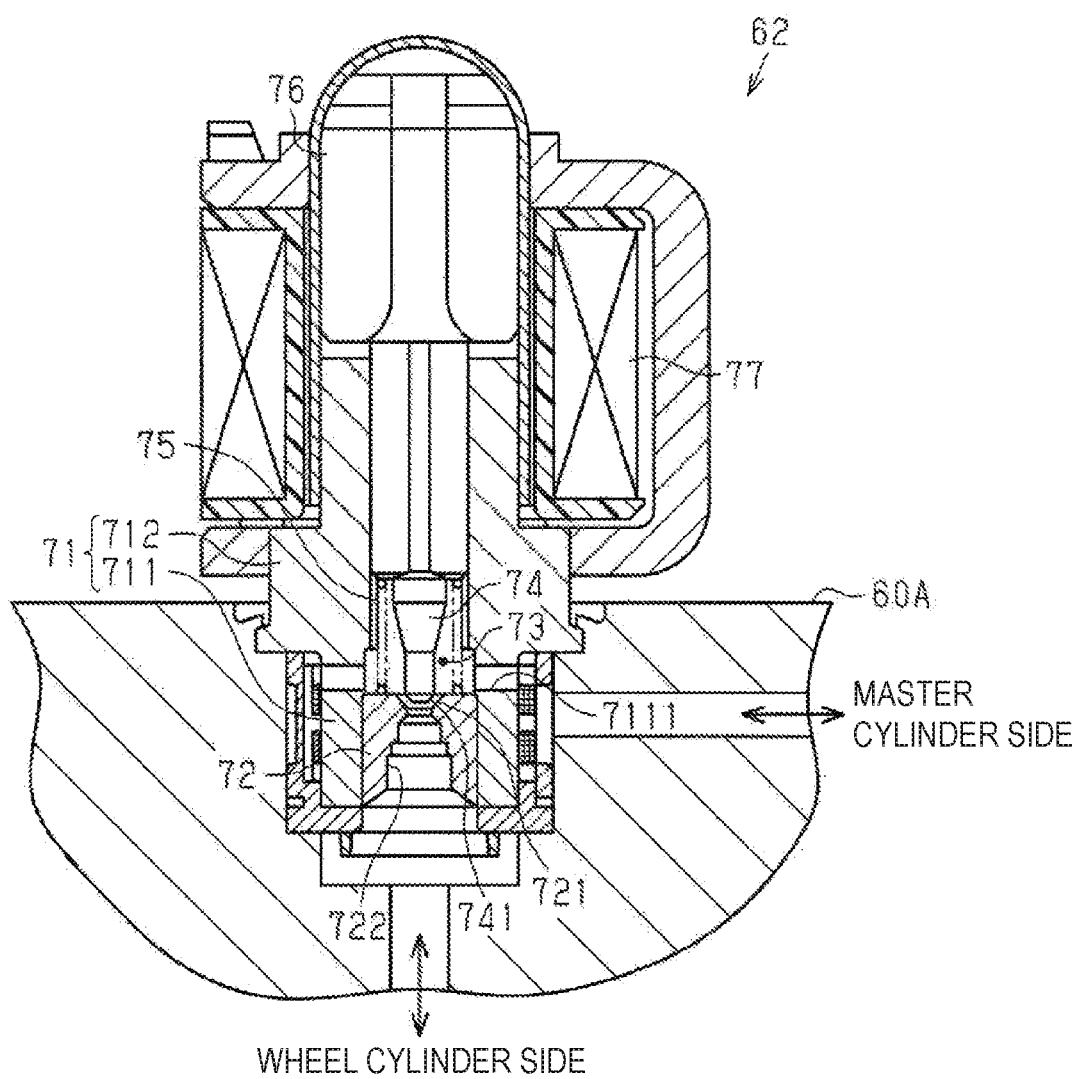
FIG. 2 is a cross-sectional view showing a configuration of a differential pressure adjustment valve that configures the braking device.

As shown in FIG. 2, the differential pressure adjustment valve 62 is attached to a housing 60A of the braking actuator 60, and includes a substantially cylindrical guide 71 extending in the axial direction which is the up and down direction in the drawing. The guide 71 has a basal end portion 711 which is a portion on the lower side in the drawing and a distal end portion 712 which is a portion on the upper side in the drawing. A seat 72 is provided in the basal end portion 711 in a press-fit state. A valve chamber 73 is formed on the upper side in the figure than the seat 72 in the guide 71.

The seat 72 includes a valve seat 721 formed at a portion facing the valve chamber 73, and an inflow passage 722 extending in the axial direction (specifically, downward in the drawing) from the valve seat 721. The inflow passage 722 communicates with the wheel cylinder 21 side. Therefore, the flow of the brake fluid between the valve chamber 73 and the wheel cylinder 21 is performed through the inflow passage 722.

An outflow passage 7111 communicating with the inside of the valve chamber 73 is provided on the peripheral wall of the basal end portion 711 of the guide 71. The outflow passage 7111 communicates with the master cylinder 51 side. Therefore, the outflow of the brake fluid from the valve chamber 73 to the master cylinder 51 side and the inflow of the brake fluid from the master cylinder 51 side to the valve chamber 73 are performed through the outflow passage 7111.

Furthermore, the differential pressure adjustment valve 62 includes a valve body 74 that moves in a direction of moving toward and moving away from the valve seat 721 inside the distal end portion 712 of the guide 71. A distal end 741 which is the lower end of the valve body 74 in the figure can be seated on the valve seat 721 of the seat 72, and when the valve body 74 is seated on the valve seat 721, an inflow passage 722 opened to the valve seat 721 is closed by the valve body 74, and thus the communication between the valve chamber 73 and the wheel cylinder 21 is blocked. The valve body 74 is biased by a coil spring 75 in a direction of moving away from the valve seat 721 (i.e., upward in the drawing).

Furthermore, the differential pressure adjustment valve 62 includes a plunger 76 fixed to the valve body 74 and a solenoid 77 located on the radially outer side of the valve body 74 and the plunger 76. When a control signal is input to the solenoid 77 from the control device 100 of the braking device 40, a current having a magnitude corresponding to the control signal flows. The electromagnetic force is generated by the current flowing through the solenoid 77 in such a manner. The electromagnetic force acts in the direction opposite to the direction biased by a coil spring 75, that is, the direction in which the valve body 74 and the plunger 76 are pushed against the valve seat 721 (i.e., downward in the figure). Therefore, the force for pushing the valve body 74 against the valve seat 721 can be adjusted by adjusting the magnitude of the current flowing through the solenoid 77, that is, the differential pressure command value PsubI with respect to the differential pressure adjustment valve 62.

Specifically, by increasing the differential pressure command value PsubI, the current value input to the differential pressure adjustment valve 62 increases, that is, the current flowing through the solenoid 77 increases and the force in the direction of pushing the valve body 74 against the valve seat 721 can be increased. On the other hand, by reducing the differential pressure command value PsubI, the current value input to the differential pressure adjustment valve 62 reduces, that is, the current flowing through the solenoid 77 reduces, and the force in the direction of pushing the valve body 74 against the valve seat 721 can be decreased.

When the WC pressure Pwc is adjusted under a situation where the braking operation member 41 is not operated, the operations of the differential pressure adjustment valve 62 and the pump 68 are controlled as necessary. For example, when the differential pressure Psub is made equal to the first differential pressure, the differential pressure command value PsubI with respect to the differential pressure adjustment valve 62 is set to the first differential pressure. In this case, the current corresponding to the differential pressure command value PsubI and the discharge amount of the brake of the pump 68 flows through the solenoid 77 of the differential pressure adjustment valve 62, and the electromagnetic force corresponding to the magnitude of the current is generated in the differential pressure adjustment valve 62.

When the differential pressure Psub is less than the first differential pressure, the valve body 74 is seated on the valve seat 721 in the differential pressure adjustment valve 62, and the brake fluid discharged from the pump 68 is supplied toward the wheel cylinder 21 side without returning toward the master cylinder 51 side through the differential pressure adjustment valve 62. Thereafter, when the differential pressure Psub reaches the first differential pressure, the valve body 74 is separated from the valve seat 721 in the differential pressure adjustment valve 62, and the brake fluid discharged from the pump 68 is returned toward the master cylinder 51 side through the differential pressure adjustment valve 62. Thus, the differential pressure Psub is held at the first differential pressure.

Next, the control device 100 of the braking device 40 will be described with reference to FIG. 1.

As shown in FIG. 1, a fluid pressure sensor 151 for detecting the MC pressure Pmc in the master cylinder 51 and a wheel speed sensor 152 for detecting the wheel speed VW of the wheel 10 are electrically connected to the control device 100. Such control device 100 includes a calculation unit 110, a motor control unit 120, and a differential pressure adjustment valve control unit 130 as function units for controlling the braking actuator 60.

The calculation unit 110 calculates the wheel speed VW of the wheel 10 based on the signal output from the wheel speed sensor 152. Furthermore, the calculation unit 110 calculates the vehicle body speed VS of the vehicle using at least one of the wheel speeds VW of the wheels 10. Moreover, the calculation unit 110 calculates the MC pressure Pmc based on the signal output from the fluid pressure sensor 151.

The motor control unit 120 controls the drive of the electromotor 67, that is, the discharge amount of the brake fluid from the pump 68.

The differential pressure adjustment valve control unit 130 controls the operation of the differential pressure adjustment valve 62. That is, when the differential pressure Psub is generated, the differential pressure adjustment valve control unit 130 calculates the differential pressure command value PsubI based on the required deceleration which is a deceleration required with respect to the vehicle. Furthermore, the differential pressure adjustment valve control unit 130 estimates a pump discharge amount QP which is a brake discharge amount of the pump 68 based on the driving speed of the electromotor 67 controlled by the motor control unit 120. Then, the differential pressure adjustment valve control unit 130 determines the magnitude of the control signal input to the differential pressure adjustment valve 62 based on the calculated differential pressure command value PsubI and the pump discharge amount QP (i.e., current value input to the differential pressure adjustment valve 62), and inputs the control signal to the differential pressure adjustment valve 62.

A vehicle equipped with the braking device 40 of the present embodiment is provided with a function of automatically adjusting the vehicle body speed VS, such as adaptive cruise control and automatic driving control. When such a function is operating, the vehicle may be automatically decelerated and stopped by the operation of the braking actuator 60. When such automatic braking control is performed, the differential pressure adjustment valve control unit 130 calculates the differential pressure command value PsubI corresponding to the required deceleration with respect to the vehicle, and inputs the control signal corresponding to the pump discharge amount QP and the differential pressure command value PsubI to the differential pressure adjustment valve 62 to operate the differential pressure adjustment valve 62. Then, when the vehicle is stopped, the differential pressure adjustment valve control unit 130 calculates a stoppage maintaining differential pressure PsubA1 which is the above-described differential pressure Psub of an extent of maintaining the stoppage, and makes the differential pressure command value PsubI equal to the stoppage maintaining differential pressure PsubA1. Furthermore, the motor control unit 120 stops the drive of the electromotor 67, that is, the operation of the pump 68. Therefore, the differential pressure adjustment valve control unit 130 determines a control signal (i.e., current value input to the differential pressure adjustment valve 62) based on both that the differential pressure command value PsubI is equal to the stoppage maintaining differential pressure PsubA1 and that the pump discharge amount QP is "0 (zero)", and inputs the control signal to the differential pressure adjustment valve 62. In the present embodiment, the automatic braking control for controlling the operation of the differential pressure adjustment valve 62 based on the stoppage maintaining differential pressure PsubA1 under a situation where the vehicle is stopped and the operation of the pump 68 is stopped is referred to as "holding control".

As shown in FIG. 1, the differential pressure adjustment valve control unit 130 includes a valve-opening control unit 131 and a valve-closing control unit 132 as function units that control the operation of the differential pressure adjustment valve 62 during the holding control.

The valve-opening control unit 131 controls the operation of the differential pressure adjustment valve 62 when an increase in the manipulated variable BPInput of the braking operation member 41 is detected during the holding control. That is, the valve-opening control unit 131 reduces the differential pressure command value PsubI and increases the opening degree of the differential pressure adjustment valve 62 than before the detection of the increase in the manipulated variable BPInput. When the current value corresponding to the stoppage maintaining differential pressure PsubA1 is set to the stoppage maintaining current value, the valve-opening control unit 131 decreases the current value input to the differential pressure adjustment valve 62 to smaller than the stoppage maintaining current value to increase the opening degree of the differential pressure adjustment valve 62. That is, the valve-opening control unit 131 increases the opening degree of the differential pressure adjustment valve 62 by decreasing the differential pressure command value PsubI until a decrease in the manipulated variable BPInput is detected after the detection of the increase in the manipulated variable BPInput. Thus, when the driver increases the manipulated variable BPInput of the braking operation member 41 again, the opening degree of the differential pressure adjustment valve 62 has already increased, and thus generation of noise involved in the opening/closing of the differential pressure adjustment valve 62 and shock on the braking operation member 41 can be suppressed.

The valve-closing control unit 132 controls the operation of the differential pressure adjustment valve 62 when decrease in the manipulated variable BPInput of the braking operation member 41 is detected under a situation where the opening degree of the differential pressure adjustment valve 62 is increased by the valve-opening control unit 131. In other words, the valve-closing control unit 132 sets the differential pressure command value PsubI to a value larger than the stoppage maintaining differential pressure PsubA1, and performs a first pushing process, which is an example of a pushing process for shifting the differential pressure adjustment valve 62 from a non-closed state to a closed state. By performing the first pushing process, the current value input to the differential pressure adjustment valve 62 is set to a value larger than the stoppage maintaining current value, that is, a value larger than when the differential pressure command value PsubI is set to the stoppage maintaining differential pressure PsubA1. In this regard, in the present embodiment, the stoppage maintaining differential pressure PsubA1 corresponds to an example of "prescribed differential pressure", and the stoppage maintaining current value corresponds to an example of "prescribed current value".

Furthermore, the valve-closing control unit 132 performs a holding process for setting the differential pressure command value PsubI to the stoppage maintaining differential pressure PsubA1 after the termination of the first pushing process. The current value input to the differential pressure adjustment valve 62 is set to the stoppage maintaining current value by carrying out the holding process. Moreover, the valve-closing control unit 132 performs a second pushing process which is an example of another pushing process for making the differential pressure command value PsubI larger than the stoppage maintaining differential pressure PsubA1 when a specific timing that is a timing for holding the WC pressure Pwc in the wheel cylinder 21 is reached under a situation where the holding process is carried out. By performing the second pushing process, the current value input to the differential pressure adjustment valve 62 is set to a value larger than the stoppage maintaining current value, that is, a value larger than when the differential pressure command value PsubI is set to the stoppage maintaining differential pressure PsubA1. Then, the valve-closing control unit 132 performs the holding process again after the termination of the second pushing process.

The time for performing both the first pushing process and the second pushing process is set to a time during which the differential pressure adjustment valve 62 can be closed by performing the pushing process, respectively, and is for example, several tens of milliseconds.

Next, a processing routine which the differential pressure adjustment valve control unit 130 starts to execute when the vehicle stops due to the execution of automatic braking control will be described with reference to FIG. 3. For example, the differential pressure adjustment valve control unit 130 determines that the vehicle has stopped when the vehicle body speed VS calculated by the calculation unit 110 becomes less than or equal to a stop determination value VSTh, and starts the execution of the processing routine.

Figure 3:
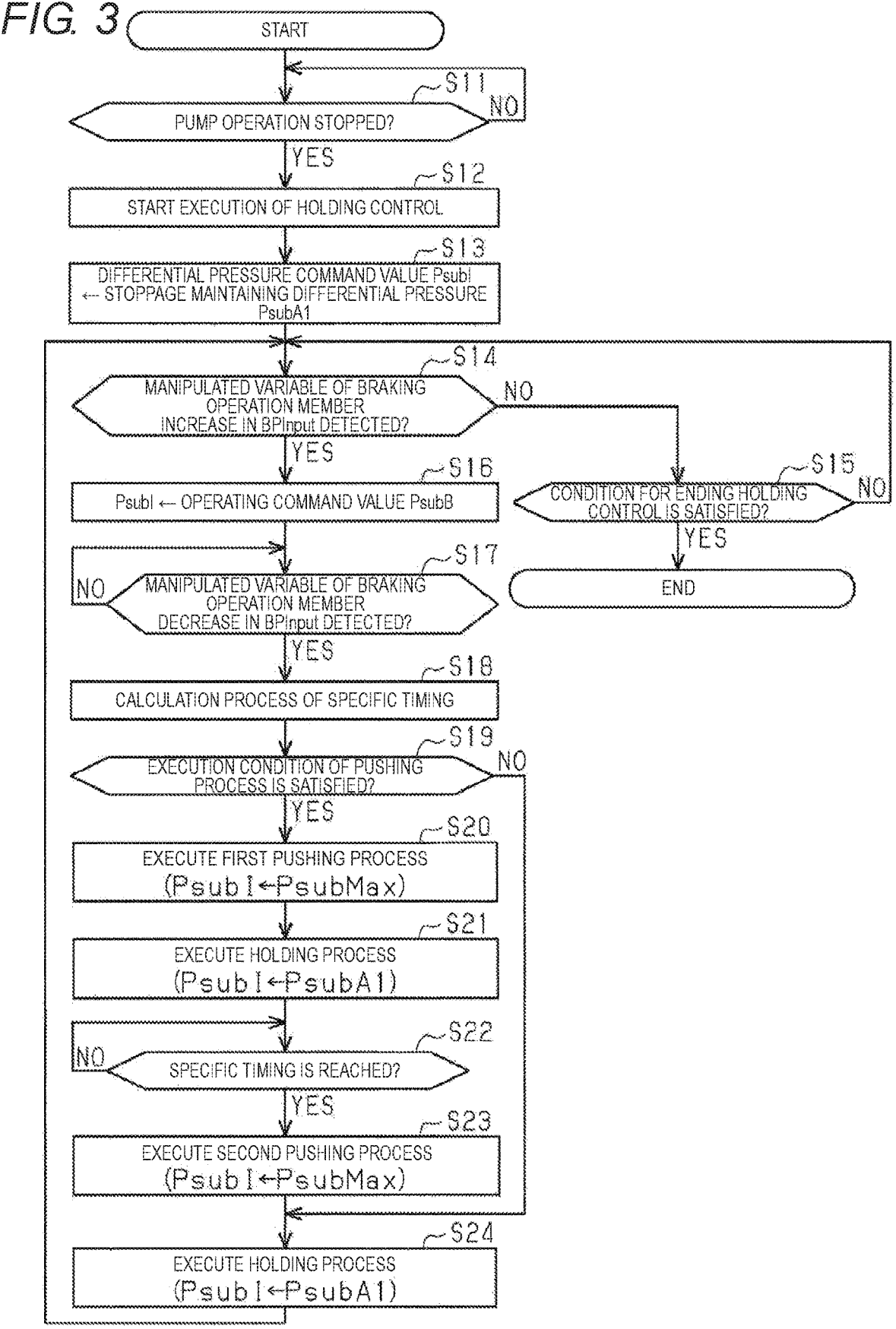
FIG. 3 is a flowchart describing a processing routine executed by the control device.

As shown in FIG. 3, in this processing routine, in the first step S11, determination is made on whether or not the operation of the pump 68 of the braking actuator 60 is stopped. For example, the differential pressure adjustment valve control unit 130 can determine that the operation of the pump 68 is stopped when the pump discharge amount QP is "0 (zero)". When the operation of the pump 68 is not stopped (step S11: NO), the determination process of step S11 is repeatedly executed.

On the other hand, when the operation of the pump 68 is stopped (step S11: YES), the process proceeds to the next step S12. In step S12, the execution of the holding control is started. In the next step S13, the differential pressure command value PsubI is set to the stoppage maintaining differential pressure PsubA1. That is, the current value input to the differential pressure adjustment valve 62 is set to the stoppage maintaining current value that is a value corresponding to the stoppage maintaining differential pressure PsubA1. The stoppage maintaining differential pressure PsubA1 may be a preset fixed value or a value that varies depending on the situation. When the stoppage maintaining differential pressure PsubA1 is varied as described above, for example, the stoppage maintaining differential pressure PsubA1 may be a value corresponding to the slope of the stopped road surface.

Next, in step S14, determination is made on whether or not an increase in the manipulated variable BPInput of the braking operation member 41 is detected. For example, the differential pressure adjustment valve control unit 130 calculates the increase amount PmcI of the MC pressure Pmc from the time point the holding control started based on the MC pressure Pmc in the master cylinder 51 calculated by the calculation unit 110. The differential pressure adjustment valve control unit 130 detects an increase in the manipulated variable BPInput when the increase amount PmcI is greater than or equal to the increase determination value, and does not detect the increase in the manipulated variable BPInput when the increase amount PmcI is less than the increase determination value.

When it is not determined that an increase in the manipulated variable BPInput of the braking operation member 41 has been detected (step S14: NO), the process proceeds to the next step S15. In step S15, determination is made on whether or not a terminating condition for the holding control is satisfied. For example, the terminating condition for the holding control includes a case where the vehicle is started. When the terminating condition is not satisfied (step S15: NO), the process proceeds to step S14. On the other hand, when the terminating condition is satisfied (step S15: YES), this processing routine is terminated.

On the other hand, when it is determined in step S14 that an increase in the manipulated variable BPInput of the braking operation member 41 has been detected (YES), the process proceeds to the next step S16. In step S16, the valve-closing control unit 132 changes the differential pressure command value PsubI to an operating command value PsubB. That is, the current value input to the differential pressure adjustment valve 62 is set to a value corresponding to the operating command value PsubB. The operating command value PsubB is a value smaller than the stoppage maintaining differential pressure PsubA1, and is equal to, for example, "0 (zero)". When the operating command value PsubB is equal to "0 (zero)", the current value input to the differential pressure adjustment valve 62 is also set to "0 (zero)".

In the next step S17, determination is made on whether or not a decrease in the manipulated variable BPInput of the braking operation member 41 is detected. For example, the differential pressure adjustment valve control unit 130 calculates a decrease amount PmcD of the MC pressure Pmc from the time point when the differential pressure command value PsubI is set to the operating command value PsubB based on the MC pressure Pmc in the master cylinder 51 calculated by the calculation unit 110. The differential pressure adjustment valve control unit 130 detects a decrease in the manipulated variable BPInput when the decrease amount PmcD is greater than or equal to the decrease determination value, and does not detect the decrease in the manipulated variable BPInput when the decrease amount PmcD is less than the decrease determination value.

When it is not determined that the decrease in the manipulated variable BPInput of the braking operation member 41 has been detected (step S17: NO), the determination process in step S17 is repeatedly executed. On the other hand, when it is determined that a decrease in the manipulated variable BPInput has been detected (step S17: YES), the process proceeds to the next step S18. In step S18, the valve-closing control unit 132 executes the calculation processing of the specific timing described above. In the present embodiment, the timing at which the manipulated variable BPInput becomes equal to "0 (zero)", that is, the timing at which the operation of the braking operation member 41 is canceled corresponds to the specific timing. In the calculation process, the specific timing is calculated based on a pre-start MC pressure PmcA, which is the MC pressure Pmc in the master cylinder 51 before the start of the first pushing process to be described later, that is, when the decrease in the manipulated variable BPInput is detected, and the decrease rate of the MC pressure Pmc correlated with the decrease rate of the manipulated variable BPInput.

Specifically, the higher the decrease rate of the MC pressure Pmc, the higher the decrease rate of the manipulated variable BPInput, and the time required for the operation of the braking operation member 41 to be canceled tends to be shortened. Furthermore, the lower the pre-start MC pressure PmcA, the shorter the time required for the operation of the braking operation member 41 to be canceled. Therefore, the arrival time TM, which is a predicted value of the time from the current time point to the specific timing, becomes shorter as the decrease rate of the MC pressure Pmc becomes higher. The arrival time TM becomes shorter as the pre-start MC pressure PmcA becomes lower. Then, the time point when the arrival time TM has elapsed from the current time point is derived as the specific timing.

Next, in step S19, determination is made on whether or not an execution condition of the pushing process is satisfied. In other words, even if the first pushing process and the second pushing process are not performed, when it cannot be predicted that the differential pressure Psub may greatly fall below the stoppage maintaining differential pressure PsubA1 after the specific timing, it cannot be predicted that the WC pressure Pwc in the wheel cylinder 21 may greatly fall below the intended pressure value, and thus it can be determined that the execution condition of the pushing process is not satisfied. In the case of the present embodiment, the "intended pressure value" is "the stoppage maintaining differential pressure PsubA1". When the decrease rate of the MC pressure Pmc is low, the amount of brake fluid flowing from the wheel cylinder 21 side to the master cylinder 51 side through the differential pressure adjustment valve 62 is small. Therefore, even if the pushing process is not performed, the differential pressure Psub can be suppressed from greatly falling below the stoppage maintaining differential pressure PsubA1, that is, the WC pressure Pwc from greatly falling below the intended pressure value by setting the differential pressure command value PsubI set to the stoppage maintaining differential pressure PsubA1. Furthermore, when the stoppage maintaining differential pressure PsubA1 is small, the amount of brake fluid flowing from the wheel cylinder 21 side toward the master cylinder 51 side through the differential pressure adjustment valve 62 tends to decrease after the differential pressure Psub reaches the stoppage maintaining differential pressure PsubA1 or a value close to the stoppage maintaining differential pressure PsubA1. In other words, the flow of the brake fluid passing through the differential pressure adjustment valve 62 tends to be weak, so that even if the force for pushing the valve body 74 against the valve seat 721 in the differential pressure adjustment valve 62 is not so large, the valve body 74 can be easily seated on the valve seat 721. Therefore, when the stoppage maintaining differential pressure PsubA1 is small, even if the pushing process is not performed, the differential pressure Psub can be suppressed from greatly falling below the stoppage maintaining differential pressure PsubA1, that is, the WC pressure Pwc from greatly falling below the intended pressure value.

On the other hand, when the first pushing process and the second pushing process are not performed, if it can be predicted that the differential pressure Psub may greatly fall below the stoppage maintaining differential pressure PsubA1 after the specific timing, it can be predicted that the WC pressure Pwc may greatly fall below the intended pressure value, and thus it can be determined that the execution condition of the pushing process is satisfied. When the decrease rate of the MC pressure Pmc is high, the increase rate of the differential pressure Psub is high, and the increase rate of the amount of brake fluid flowing from the wheel cylinder 21 side toward the master cylinder 51 side through the differential pressure adjustment valve 62 is high, and thus the flow of the brake fluid passing through the Differential pressure adjustment valve 62 tends to become strong. As a result, when the pushing process is not performed, the differential pressure adjustment valve 62 cannot be closed, or even if the differential pressure adjustment valve 62 is closed, the inflow passage 722 cannot be closed by the valve body 74 in this case, even after the differential pressure Psub reaches the stoppage maintaining differential pressure PsubA1, the brake fluid in the wheel cylinder 21 flows out toward the master cylinder 51 side through the differential pressure adjustment valve 62. As a result, after the specific timing, the differential pressure Psub greatly falls below the stoppage maintaining differential pressure PsubA1, and the WC pressure Pwc greatly falls below the intended pressure value. Furthermore, when the stoppage maintaining differential pressure PsubA1 is large, that is, when the differential pressure Psub to be held after the specific timing is large, the flow of brake fluid passing through the differential pressure adjustment valve 62 is strong at the specific timing when the differential pressure adjustment valve 62 is switched from the opened state to the closed state. Thus, at such specific timing, the valve body 74 cannot be seated on the valve seat 721 in the differential pressure adjustment valve 62, or the valve body 74 may be seated on the valve seat 721 but the inflow passage 722 opened to the valve seat 721 cannot be closed by the valve body 74. In this case, even after the specific timing, the brake fluid in the wheel cylinder 21 flows out toward the master cylinder 51 side through the differential pressure adjustment valve 62, and the differential pressure Psub greatly falls below the stoppage maintaining differential pressure PsubA1, and the WC pressure Pwc greatly falls below the intended pressure value.

Therefore, for example, when at least one of the decrease rate of the MC pressure Pmc is greater than or equal to the determination decrease rate and the stoppage maintaining differential pressure PsubA1 is greater than or equal to the determination differential pressure is satisfied, it can be determined that the execution condition of the pushing process is satisfied. In this case, when the decrease rate of the MC pressure Pmc is less than the determination decrease rate and the stoppage maintaining differential pressure PsubA1 is less than the determination differential pressure, it can be determined that the execution condition of is not satisfied.

Therefore, when it is not determined in step S19 that the execution condition of the pushing process is satisfied (NO), the process proceeds to step S24 to be described later. On the other hand, when it is determined that the execution condition of the pushing process is satisfied (step S19: YES), the process proceeds to the next step S20. In step S20, the valve-closing control unit 132 performs the first pushing process. In the first pushing process performed in the present embodiment, the differential pressure command value PsubI is set to the differential pressure maximum value PsubMax. The differential pressure maximum value PsubMax is the maximum value of the differential pressure that can be instructed to the differential pressure adjustment valve 62. That is, the current value input to the differential pressure adjustment valve 62 is set to a value corresponding to the differential pressure maximum value PsubMax. When the first pushing process has ended, the process proceeds to the next step S21.

In step S21, the valve-closing control unit 132 performs the holding process. In the holding process, the differential pressure command value PsubI is set to the stoppage maintaining differential pressure PsubA1. That is, the current value input to the differential pressure adjustment valve 62 is set to the stoppage maintaining current value. Subsequently, in step S22, determination is made on whether or not the specific timing calculated in step S18 has been reached. When the specific timing has not yet been reached (step S22: NO), the determination process of step S22 is repeatedly executed. On the other hand, when the specific timing has been reached (step S22: YES), the process proceeds to the next step S23.

In step S23, the valve-closing control unit 132 performs the second pushing process. In the second pushing process performed in the present embodiment, the differential pressure command value PsubI is set to the differential pressure maximum value PsubMax, as in the first pushing process. That is, the current value input to the differential pressure adjustment valve 62 is set to a value corresponding to the differential pressure maximum value PsubMax. When the second pushing process has ended, the process proceeds to the next step S24.

In step S24, the valve-closing control unit 132 performs the holding process again. That is, the differential pressure command value PsubI is returned to the stoppage maintaining differential pressure PsubA1. That is, the current value input to the differential pressure adjustment valve 62 is returned to the stoppage maintaining current value. Thereafter, the present processing routine is terminated.

Next, the operation when the holding control is performed will be described together with effects with reference to FIGS. 4 to 7.

First, the operation when the holding control of the comparative example not including the pushing process is performed will be described. The holding control of the comparative example is a control for holding the differential pressure command value PsubI at the stoppage maintaining differential pressure PsubA1 after a decrease in the manipulated variable BPInput of the braking operation member is detected.

Figure 4A:
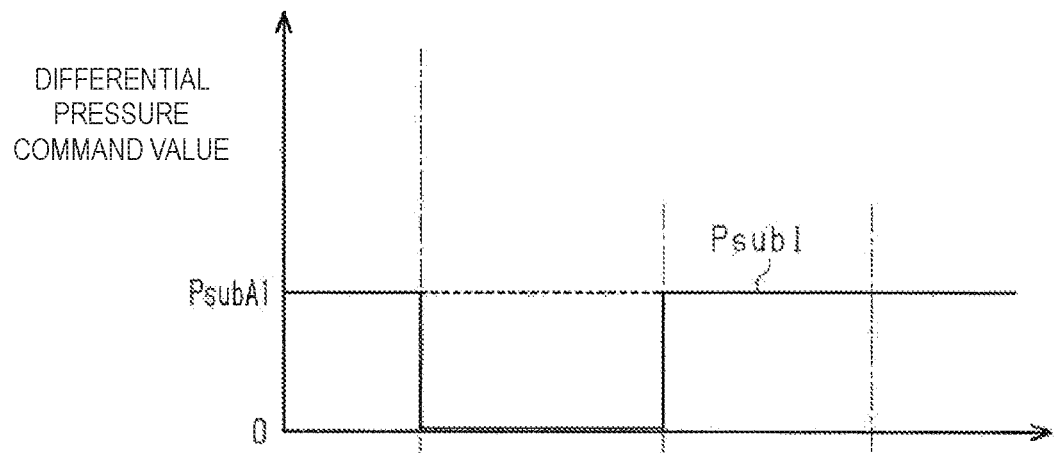
FIGS. 4(*a*) to 4(*c*) are timing charts when a holding control of a comparative example is performed.
Figure 4B:
Figure 4C:
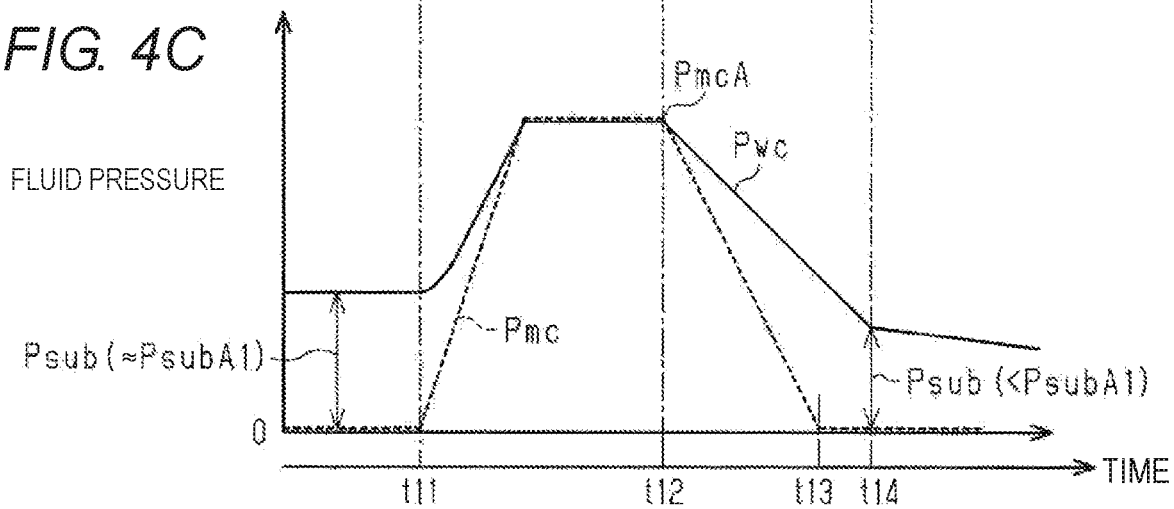

As shown in FIGS. 4(a), 4(b), and 4(c), when the operation of the pump 68 is stopped after the vehicle is stopped, the holding control of the comparative example is started, and the differential pressure command value PsubI is held at the stoppage maintaining differential pressure PsubA1. That is, the current value input to the differential pressure adjustment valve 62 is held at the stoppage maintaining current value. In this case, since the differential pressure adjustment valve 62 is closed, the differential pressure Psub on the master cylinder 51 side and the wheel cylinder 21 side relative to the differential pressure adjustment valve 62 is held at the stoppage maintaining differential pressure PsubA1 or a value close to the stoppage maintaining differential pressure PsubA1. Then, since the MC pressure Pmc in the master cylinder 51 starts to increase at the first timing t11, an increase in the manipulated variable BPInput of the braking operation member 41 is detected. Then, the differential pressure command value PsubI is changed from the stoppage maintaining differential pressure PsubA1 to the operating command value PsubB (=0 (zero)). That is, the current value input to the differential pressure adjustment valve 62 is changed to a value corresponding to the operating command value PsubB. Therefore, in the differential pressure adjustment valve 62, a force for pushing the valve body 74 against the valve seat 721 is eliminated, so that the differential pressure adjustment valve 62 is opened. As a result, the MC pressure Pmc in the master cylinder 51 is increased, and the WC pressure Pwc in the wheel cylinder 21 is also increased.

Then, the MC pressure Pmc starts to decrease at the second timing t12 in a state in which the WC pressure Pwc is substantially equal to the MC pressure Pmc, and a decrease in the manipulated variable BPInput of the braking operation member 41 is detected, so that the differential pressure command value PsubI is returned from the operating command value PsubB to the stoppage maintaining differential pressure PsubA1. That is, the current value input to the differential pressure adjustment valve 62 is returned to the stoppage maintaining current value. In the example shown in FIG. 4, the braking operation by the driver is canceled at the third timing t13.

Here, in a situation where the execution condition of the pushing process described above is not satisfied, when the differential pressure command value PsubI is set to the stoppage maintaining differential pressure PsubA1, the valve body 74 is seated on the valve seat 721 in the differential pressure adjustment valve 62 and the inflow passage 722 opened to the valve seat 721 is closed by the valve body 74. Therefore, the brake fluid in the wheel cylinder 21 hardly flows out toward the master cylinder 51 side through the differential pressure adjustment valve 62. As a result, the WC pressure Pwc is held and the differential pressure Psub is increased. When the differential pressure Psub reaches the stoppage maintaining differential pressure PsubA1, the differential pressure adjustment valve 62 opens, and the brake fluid in the wheel cylinder 21 flows out toward the master cylinder 51 side through the differential pressure adjustment valve 62. Thus, the WC pressure Pwc decreases while maintaining the differential pressure Psub. That is, the differential pressure Psub can be held at the stoppage maintaining differential pressure PsubA1 or a value close to the stoppage maintaining differential pressure PsubA1. Therefore, after the specific timing at which the operation of the braking operation member 41 is canceled, the WC pressure Pwc in the wheel cylinder 21 is held at the stoppage maintaining differential pressure PsubA1 which is an intended pressure value or a value close to the stoppage maintaining differential pressure PsubA1.

Figure 5:
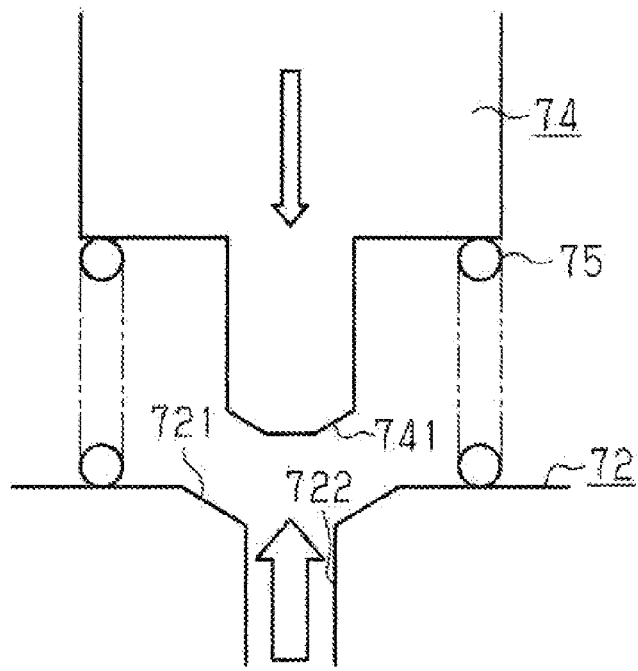
FIG. 5 is a schematic diagram showing a state in which a valve body cannot be seated on a valve seat in a differential pressure adjustment valve.

However, in a situation where the execution condition of the pushing process described above is satisfied, even when the differential pressure command value PsubI is set to the stoppage maintaining differential pressure PsubA1, the differential pressure Psub cannot be held at the stoppage maintaining differential pressure PsubA1 or a value close to the stoppage maintaining differential pressure PsubA1. That is, when the manipulated variable BPInput of the braking operation member 41 is decreased and the MC pressure Pmc starts to decrease, the amount of brake fluid flowing out from the wheel cylinder 21 side toward the master cylinder 51 side through the differential pressure adjustment valve 62 is large. Therefore, the valve body 74 cannot be seated on the valve seat 721 as shown in FIG. 5 due to the force of the brake fluid.

Figure 6:
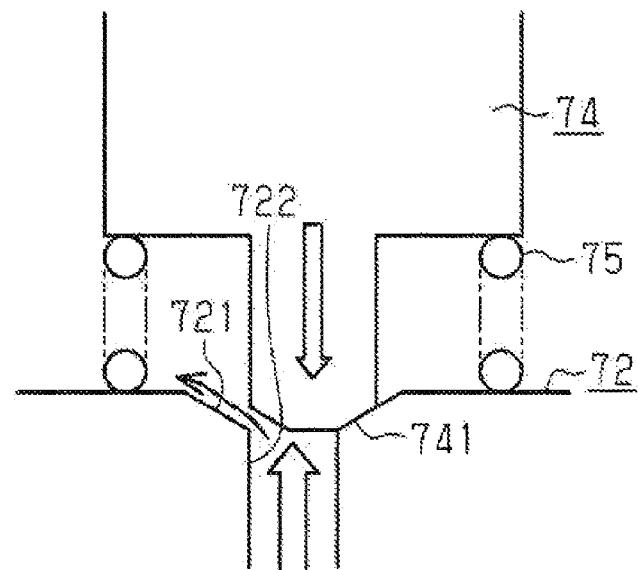
FIG. 6 is a schematic diagram showing a state in which an inflow passage opened to the valve seat cannot be closed by the valve body in the differential pressure adjustment valve.

As a result, as shown in FIG. 4, when the MC pressure Pmc starts to decrease, the brake fluid in the wheel cylinder 21 flows out toward the master cylinder 51 side through the differential pressure adjustment valve 62 although the differential pressure Psub is sufficiently smaller than the stoppage maintaining differential pressure PsubA1. That is, the WC pressure Pwc decreases before the differential pressure Psub reaches the stoppage maintaining differential pressure PsubA1. Such a decrease in the WC pressure Pwc is continued even when the driver's braking operation is canceled and the WC pressure Pwc becomes lower than the pressure corresponding to the stoppage maintaining differential pressure PsubA1. That is, even if the specific timing has elapsed, the decrease in the differential pressure Psub is continued. At the fourth timing t14 thereafter, the valve body 74 is seated on the valve seat 721 in the differential pressure adjustment valve 62, and the differential pressure adjustment valve 62 is closed, but as shown in FIG. 6, the inflow passage 722 opened to the valve seat 721 may not be closed by the valve body 74. In this case, even after the fourth timing t14, as shown by the solid line in FIG. 6, the brake fluid in the wheel cylinder 21 flows out toward the master cylinder 51 side through the differential pressure adjustment valve 62. That is, after the specific timing, the WC pressure Pwc in the wheel cylinder 21 greatly falls below the stoppage maintaining differential pressure PsubA1, that is, the intended pressure value.

Next, a case where the holding control of the present embodiment is performed will be described. As a premise, when a decrease in the manipulated variable BPInput of the braking operation member 41 is detected, it is assumed that the execution condition of the pushing process is satisfied.

Figure 7A:
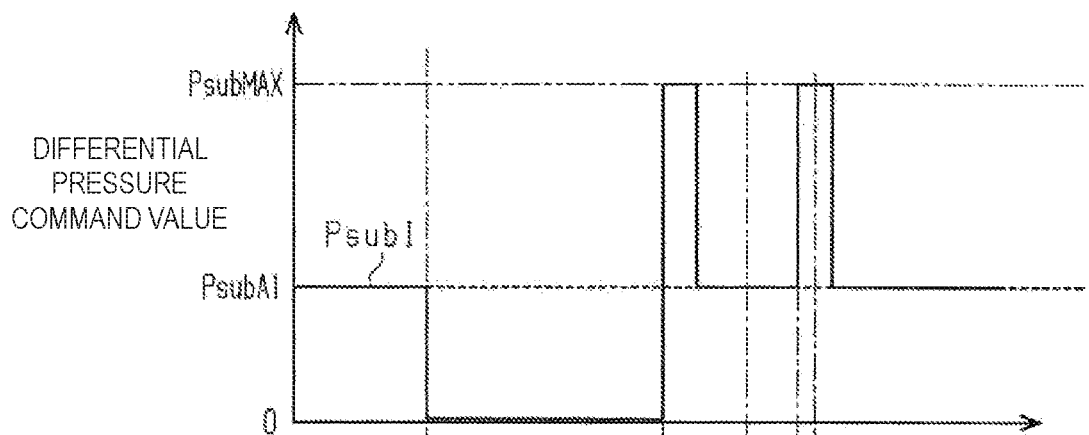
FIGS. 7(*a*) to 7(*c*) are timing charts when a holding control of the embodiment is performed.
Figure 7B:
Figure 7C:
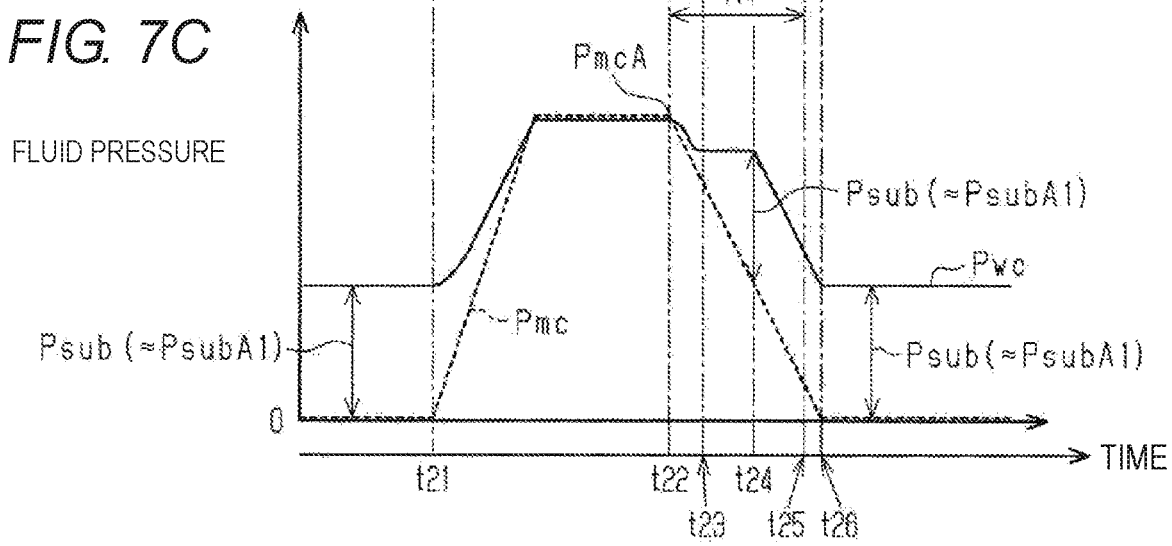

As shown in FIGS. 7(a), 7(b), and 7(c), since the MC pressure Pmc in the master cylinder 51 starts to increase at the first timing t21 under the situation that the differential pressure command value PsubI is held at the stoppage maintaining differential pressure PsubA1, an increase in the manipulated variable BPInput of the braking operation member 41 is detected. Then, the differential pressure command value PsubI is changed from the stoppage maintaining differential pressure PsubA1 to the operating command value PsubB (=0 (zero)). That is, the current value input to the differential pressure adjustment valve 62 is changed from the stoppage maintaining current value to a value corresponding to the operating command value PsubB. As a result, the differential pressure adjustment valve 62 is opened, and the brake fluid in the master cylinder 51 flows out toward the wheel cylinder 21 side through the differential pressure adjustment valve 62. That is, the manipulated variable BPInput can be increased in accordance with an increase in the operation force input to the braking operation member 41 by the driver. As a result, the deterioration of the feeling felt by the driver with respect to the operation of the braking operation member 41 can be suppressed. In this case, the MC pressure Pmc in the master cylinder 51 and the WC pressure Pwc in the wheel cylinder 21 increase in conjunction with the increase in the manipulated variable BPInput.

When the MC pressure Pmc starts to decrease at the second timing t22 in a state in which the WC pressure Pwc is substantially equal to the MC pressure Pmc, a decrease in the manipulated variable BPInput of the braking operation member 41 is detected. Then, the differential pressure command value PsubI is set to the differential pressure maximum value PsubMax larger than the stoppage maintaining differential pressure PsubA1 by the execution of the first pushing process. That is, the current value input to the differential pressure adjustment valve 62 is changed to a value corresponding to the differential pressure maximum value PsubMax. In this case, compared with a case where the differential pressure command value PsubI is set to the stoppage maintaining differential pressure PsubA1, the force for pushing the valve body 74 against the valve seat 721 in the differential pressure adjustment valve 62 increases. As a result, as opposed to the comparative example, the differential pressure adjustment valve 62 can be closed, and the outflow of the brake fluid from the wheel cylinder 21 side toward the master cylinder 51 side through the differential pressure adjustment valve 62 can be suppressed. Thus, the WC pressure Pwc can be held from the third timing t23 during the decrease of the manipulated variable BPInput. Note that the period from the second timing t22 to the third timing t23, that is, the period during which the WC pressure Pwc is decreasing is a time lag from when the differential pressure command valve PsubI is set to the stoppage maintaining differential pressure PsubA1 until the differential pressure adjustment valve 62 is actually closed.

When the first pushing process has ended, the holding process is started. Then, the differential pressure command value PsubI is changed from the differential pressure maximum value PsubMax to the stoppage maintaining differential pressure PsubA1. That is, the current value input to the differential pressure adjustment valve 62 is changed to the stoppage maintaining current value. In this case, the differential pressure command value PsubI is not set to the stoppage maintaining differential pressure PsubA1 in a state in which the differential pressure adjustment valve 62 is opened, and the differential pressure command value PsubI is set to the stoppage maintaining differential pressure PsubA1 in a state in which the differential pressure adjustment valve 62 is closed. That is, the differential pressure command value PsubI is set to the stoppage maintaining differential pressure PsubA1 in a state in which the flow of brake fluid from the wheel cylinder 21 side toward the master cylinder 51 side through the differential pressure adjustment valve 62 is suppressed. Therefore, a state in which the differential pressure adjustment valve 62 is closed can be held, and furthermore, the decrease in the WC pressure Pwc can be suppressed by setting the differential pressure command value PsubI to the stoppage maintaining differential pressure PsubA1.

Thereafter, when the differential pressure Psub reaches the stoppage maintaining differential pressure PsubA1 at the fourth timing t24 due to the decrease in the MC pressure Pmc corresponding to the decrease in the manipulated variable BPInput, the differential pressure adjustment valve 62 is opened, and the brake fluid in the wheel cylinder 21 flows out toward the master cylinder 51 side through the differential pressure adjustment valve 62. Thus, the WC pressure Pwc decreases while maintaining the differential pressure Psub. That is, the differential pressure Psub can be held at the stoppage maintaining differential pressure PsubA1 or a value close to the stoppage maintaining differential pressure PsubA1.

Here, as one of the methods for maintaining the stop state, a method of continuing to perform the first pushing process is also considered. In this case, the differential pressure adjustment valve 62 is closed even after the fourth timing t24. Therefore, the brake fluid in the wheel cylinder 21 does not return to the master cylinder 51, and the operation reaction force with respect to the braking operation member 41 becomes small. When the operation reaction force becomes small, the operation feeling given to the driver who is reducing the manipulated variable BPInput may deteriorate.

In this regard, in the present embodiment, the first pushing process is performed temporarily, and the holding process may be performed after the first pushing process has ended. Therefore, when the differential pressure Psub reaches the stoppage maintaining differential pressure PsubA1 as described above, the differential pressure adjustment valve 62 opens, and the brake fluid in the wheel cylinder 21 returns to the master cylinder 51. As a result, the operation reaction force with respect to the braking operation member 41 is less likely to reduce, and hence the deterioration of the operation feeling under the situation where the manipulated variable BPInput is being reduced can be suppressed.

In addition, when the differential pressure command value PsubI continues to be held at the differential pressure maximum value PsubMax, this means that a large amount of current continues to flow through the solenoid 77 of the differential pressure adjustment valve 62, which may increase the amount of heat generated by the differential pressure adjustment valve 62. In this regard, since the differential pressure command value PsubI is only temporarily set to the differential pressure maximum value PsubMax in the present embodiment, the differential pressure adjustment valve 62 can be suppressed from generating heat in excess.

Returning to FIG. 7, the fifth timing t25 is the timing when the arrival time TM has elapsed from the time point (i.e., second timing t22) the decrease in the manipulated variable BPInput of the braking operation member 41 is detected, that is, the specific timing. In the example shown in FIG. 7, the timing at which the MC pressure Pmc in the master cylinder 51 actually becomes equal to "0 (zero)" is the sixth timing t26 slightly after the fifth timing t25.

At the fifth timing t25, the second pushing process starts to be performed. Then, the differential pressure command value PsubI is set to a differential pressure maximum value PsubMax larger than the stoppage maintaining differential pressure PsubA1. That is, the current value input to the differential pressure adjustment valve 62 is changed to a value corresponding to the differential pressure maximum value PsubMax. In this case, compared with a case where the differential pressure command value PsubI is set to the stoppage maintaining differential pressure PsubA1, the force for pushing the valve body 74 against the valve seat 721 in the differential pressure adjustment valve 62 increases. Thus, the differential pressure adjustment valve 62 is closed, and the inflow passage 722 opened to the valve seat 721 can be closed by the valve body 74. That is, by strongly pushing the valve body 74 against the valve seat 721, for example, an event in which the valve body 74 is seated on the valve seat 721 in an incomplete state as shown in FIG. 6 is less likely to occur, and the valve body 74 can be seated on the valve seat 721 in a complete state. The "complete state" referred to herein is a state in which the inflow passage 722 opened to the valve seat 721 is closed by the valve body 74. As a result, at the sixth timing t26 at which the holding of the WC pressure Pwc in the wheel cylinder 21 at the stoppage maintaining differential pressure PsubA1, which is the intended pressure value, or a value close to the stoppage maintaining differential pressure PsubA1 should be started, the differential pressure command value PsubI is made to a state larger than the stoppage maintaining differential pressure PsubA1 and the differential pressure adjustment valve 62 can be closed.

Therefore, at the sixth timing t26, the decrease in the MC pressure Pmc in the master cylinder 51 is stopped, and the decrease in the WC pressure Pwc is terminated. When the second pushing process has ended, the holding process is performed again. Then, the differential pressure command value PsubI is returned to the stoppage maintaining differential pressure PsubA1. That is, the current value input to the differential pressure adjustment valve 62 is returned to the stoppage maintaining current value. In this case, the differential pressure command value PsubI is not set to the stoppage maintaining differential pressure PsubA1 in a state in which the differential pressure adjustment valve 62 is opened, and the differential pressure command value PsubI is set to the stoppage maintaining differential pressure PsubA1 in a state in which the differential pressure adjustment valve 62 is closed. That is, the differential pressure command value PsubI is set to the stoppage maintaining differential pressure PsubA1 in a state in which the flow of brake fluid from the wheel cylinder 21 side toward the master cylinder 51 side through the differential pressure adjustment valve 62 is suppressed. Therefore, a state in which the differential pressure adjustment valve 62 is closed can be maintained, and furthermore, the WC pressure Pwc can be held by holding the differential pressure command value PsubI at the stoppage maintaining differential pressure PsubA1. As a result, after the specific timing, the WC pressure Pwc can be held at the stoppage maintaining differential pressure PsubA1 which is the intended pressure value or a value close to the stoppage maintaining differential pressure PsubA1. Therefore, the controllability of the WC pressure Pwc after the start of the decrease in the manipulated variable BPInput of the braking operation member 41 can be improved.

In each pushing process performed in the present embodiment, the differential pressure maximum value PsubMax which is the maximum value of the differential pressure that can be set for the differential pressure adjustment valve 62 is set as the differential pressure command value PsubI. That is, the valve body 74 can be pushed against the valve seat 721 with the maximum possible force in the differential pressure adjustment valve 62 by performing the pushing process. Therefore, the possibility that the differential pressure adjustment valve 62 can be closed by performing the pushing process can be maximized, and the execution period of the pushing process can be suppressed from becoming long. That is, during the holding control, the period during which the differential pressure command value PsubI is set to a value larger than the stoppage maintaining differential pressure PsubA1 can be shortened as much as possible.

Furthermore, in the present embodiment, even when a decrease in the manipulated variable BPInput of the braking operation member 41 is detected under a situation where the differential pressure command value PsubI is set to the operating command value PsubB, the holding control similar to the holding control in the comparative example is performed when the execution condition of the pushing process is not satisfied. That is, after the decrease in the manipulated variable BPInput is detected, the holding control is performed in which the differential pressure command value PsubI is continuously held at the stoppage maintaining differential pressure PsubA1. Therefore, the pushing process can be suppressed from being unnecessarily performed when the differential pressure Psub can be held at the stoppage maintaining differential pressure PsubA1 without performing the pushing process.

The embodiment described above may be modified to another embodiment as described below.

The timing for starting the execution of the second pushing process may be determined through a method different from the method described in the above embodiment. For example, in a case where a sensor for detecting the WC pressure Pwc in the wheel cylinder 21 is provided, the second pushing process may be performed at the timing the sensor value of the WC pressure detected by the sensor becomes a value corresponding to the stoppage maintaining differential pressure PsubA1. Furthermore, the execution of the second pushing process may be started when determined that the operation of the braking operation member 41 has been canceled based on the detection signal from the brake switch.

In the embodiment described above, the specific timing is the timing at which the operation of the braking operation member 41 is canceled, but may be a timing different from such timing. For example, the timing at which the manipulated variable BPInput of the braking operation member 41 reaches the determination manipulated variable may be set as the specific timing. The determination manipulated variable is set to a value larger than "0 (zero)". In this case, determination may be made that the specific timing has been reached when the MC pressure Pmc reaches the fluid pressure corresponding to the determination manipulated variable. Furthermore, when a sensor for detecting the manipulated variable BPInput is provided in the braking device 40, determination may be made that the specific timing has been reached when the manipulated variable BPInput detected by the sensor reaches the determination manipulated variable.

The differential pressure command value PsubI at the time of performing the second pushing process is performed may be a value different from the differential pressure command value PsubI at the time of performing the first pushing process. For example, the differential pressure Psub increases after the first pushing process, whereas the differential pressure Psub does not increase after the second pushing process. Therefore, if the differential pressure command value PsubI at the time of performing the second pushing process is a value larger than the stoppage maintaining differential pressure PsubA1, it may be made smaller than the differential pressure command value PsubI at the time of performing the first pushing process.

The time for performing the second pushing process and the time for performing the first pushing process may be set to be different from each other.

The differential pressure command value PsubI at the time of performing the first pushing process may be a value smaller than the differential pressure maximum value PsubMax as long as the differential pressure command value PsubI is larger than the stoppage maintaining differential pressure PsubA1. For example, the smaller value of N times (e.g., 2 times) the stoppage maintaining differential pressure PsubA1 and the differential pressure maximum value PsubMax may be set as the differential pressure command value PsubI.

The differential pressure command value PsubI at the time of performing the second pushing process may be a value smaller than the differential pressure maximum value PsubMax as long as the differential pressure command value PsubI is larger than the stoppage maintaining differential pressure PsubA1. For example, the smaller value of N times (e.g., 2 times) the stoppage maintaining differential pressure PsubA1 and the differential pressure maximum value PsubMax may be set as the differential pressure command value PsubI.

The differential pressure command value PsubI at the time of performing the first pushing process may be varied according to the situation. For example, the differential pressure command value PsubI may be made smaller the lower the decrease rate of the MC pressure Pmc in the master cylinder 51. Furthermore, when varying the differential pressure command value PsubI at the time of performing the first pushing process in this way, the time for performing the first pushing process may be made longer as the differential pressure command value PsubI becomes smaller.

The differential pressure command value PsubI at the time of performing the second pushing process may be varied according to the situation. For example, the differential pressure command value PsubI may be made smaller the lower the stoppage maintaining differential pressure PsubA1. Furthermore, when varying the differential pressure command value PsubI at the time of performing the second pushing process in this way, the time for performing the second pushing process may be made longer as the differential pressure command value PsubI becomes smaller.

A different pushing process may be further performed between the execution period of the first pushing process and the execution period of the second pushing process.

The operating command value PsubB may be a value different from "0 (zero)" as long as it is a value smaller than the stoppage maintaining differential pressure PsubA1 and the driver does not feel uncomfortableness when the manipulated variable BPInput of the braking operation member 41 is increased.

In the embodiment described above, when the execution condition of the pushing process is satisfied, the first pushing process and the second pushing process are performed when a decrease in the manipulated variable BPInput of the braking operation member 41 is detected. However, if the first pushing process is performed, the second pushing process may not be performed. For example, both the first pushing process and the second pushing process are performed when both the decrease rate of the MC pressure Pmc is greater than or equal to the determination decrease rate and the stoppage maintaining differential pressure PsubA1 is greater than or equal to the determination differential pressure are satisfied, and the first pushing process may be performed and the second pushing process may not be performed when only one of the above is satisfied.

Even if the decrease rate of the MC pressure Pmc is less than the determination decrease rate and the stoppage maintaining differential pressure PsubA1 is less than the determination differential pressure, both the first pushing process and the second pushing process may be performed.

In the embodiment described above, in order to prevent the differential pressure Psub from greatly exceeding the stoppage maintaining differential pressure PsubA1 by the operation of the differential pressure adjustment valve 62 during the decrease of the manipulated variable BPInput of the braking operation member 41, the differential pressure command value PsubI is set to the stoppage maintaining differential pressure PsubA1 immediately after the first pushing process has ended. However, the timing for setting the differential pressure command value PsubI to the stoppage maintaining differential pressure PsubA1 after the first pushing process has ended may not be immediately after the first pushing process has ended. That is, the differential pressure command value PsubI may be changed to the stoppage maintaining differential pressure PsubA1 at a predetermined timing before the differential pressure Psub reaches the differential pressure command value PsubI. Even in such a case, it is preferable to provide a predetermined period in which the differential pressure command value PsubI is held at the stoppage maintaining differential pressure PsubA1 at the start of execution of the second pushing process or before the time point the differential pressure Psub reaches the differential pressure command value PsubI, and stabilize the state of the differential pressure adjustment valve 62. For example, after the first pushing process has ended, the differential pressure command value PsubI may be decreased to the stoppage maintaining differential pressure PsubA1 at a predetermined reduction speed, and thereafter, the differential pressure command value PsubI may be held at the stoppage maintaining differential pressure PsubA1.

The operation of the pump 68 may be stopped when the WC pressure Pwc in the wheel cylinder 21 is maintained at a constant value during deceleration of the vehicle, that is, at a stage where the vehicle is not yet stopped. In such a case, the holding control may be performed before the vehicle stop. In this case, when the braking operation is started under the situation where the WC pressure Pwc is held by the operation of the differential pressure adjustment valve 62, the differential pressure command value PsubI is reduced and the opening degree of the differential pressure adjustment valve 62 is increased even before the vehicle stop. Thereafter, when a decrease in the manipulated variable BPInput of the braking operation member 41 is detected, the first pushing process, the holding process, the second pushing process, and the holding process are sequentially performed. In this case, the differential pressure command value PsubI, that is, the prescribed differential pressure at the time of performing the holding process may be a value different from the value of the differential pressure command value PsubI set before the start of the braking operation.

The holding control may be hill hold control that suppresses an unintended start of the vehicle when the vehicle stops on a slope. In the hill hold control in this case, the differential pressure command value PsubI is held at the stoppage maintaining differential pressure PsubA1 after the driver's braking operation is canceled. When the driver performs the braking operation again under such a situation where the differential pressure command value PsubI is held in this way, the differential pressure command value PsubI is changed to the operating command value PsubB, and the differential pressure adjustment valve 62 is opened. When a decrease in the manipulated variable BPInput of the braking operation member 41 is detected under a situation where the differential pressure command value PsubI is held at the operating command value PsubB, the first pushing process, the holding process, the second pushing process, and the holding process may be performed in order.

The fluid pressure generator 50 may be a device having a configuration other than the configuration described in the above embodiment as long as it is a device in which an operation reaction force corresponding to the MC pressure Pmc in the master cylinder 51 is input to the braking operation member 41.

The braking actuator 60 may be a device having a configuration other than the configuration described in the above embodiment as long as it includes a control valve that operates to adjust the differential pressure between the master cylinder 51 side and the wheel cylinder 21 side.

Next, technical ideas that can be grasped from the above embodiment and another embodiment will be described below.

(A) The timing for holding the fluid pressure in the wheel cylinder is preferably the timing at which the operation of the braking operation member is canceled.

The invention claimed is:

1. A braking control device for a vehicle applied to a braking device for the vehicle including a control valve arranged between a master cylinder in which fluid pressure generated inside increases as a manipulated variable of a braking operation member increases and a wheel cylinder provided with respect to a wheel, the braking control device for the vehicle performing a holding control of holding a differential pressure, which is a pressure difference between a master cylinder side and a wheel cylinder side with respect to the control valve, at a prescribed differential pressure by setting a current value input to the control valve to a predetermined holding current value, the braking control device comprising:

a valve-opening control unit that makes the current value input to the control valve smaller than the holding current value and increases an opening degree of the control valve when increase in the manipulated variable of the braking operation member is detected during execution of the holding control; and a valve-closing control unit that, when decrease in the manipulated variable of the braking operation member is detected under a situation where the opening degree of the control valve is increased by the valve-opening control unit, sets the current value input to the control valve to a value larger than the holding current value, and performs a pushing process of shifting the control valve from a non-closed state to a closed state and a holding process of setting the current value input to the control valve at the holding current value after the pushing process has ended, wherein the valve-closing control unit performs another pushing process of setting the current value input to the control valve to a value larger than the holding current value at a timing of holding a fluid pressure in the wheel cylinder under a situation where the holding process is performed, and again performs the holding process after the other pushing process has ended.

2. The braking control device for the vehicle according to claim 1, wherein the valve-closing control unit calculates a timing to hold the fluid pressure in the wheel cylinder based on a decrease rate of the manipulated variable of the braking operation member.

* * * * *